(12) United States Patent
Hama et al.

(10) Patent No.: US 9,413,034 B2
(45) Date of Patent: Aug. 9, 2016

(54) METHOD FOR MANUFACTURING SOLID BATTERY

(75) Inventors: Shigenori Hama, Susono (JP); Shiyo Tadokoro, Toyota (JP); Koji Kawamoto, Nishikamo-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 84 days.

(21) Appl. No.: 14/118,332

(22) PCT Filed: Jul. 27, 2011

(86) PCT No.: PCT/JP2011/067057
§ 371 (c)(1),
(2), (4) Date: Nov. 18, 2013

(87) PCT Pub. No.: WO2013/014759
PCT Pub. Date: Jan. 31, 2013

(65) Prior Publication Data
US 2014/0150961 A1    Jun. 5, 2014

(51) Int. Cl.
*B29C 65/52* (2006.01)
*B29C 65/54* (2006.01)
*B32B 37/10* (2006.01)
(Continued)

(52) U.S. Cl.
CPC .......... *H01M 10/0585* (2013.01); *H01M 2/145* (2013.01); *H01M 2/1673* (2013.01); *H01M 4/043* (2013.01); *H01M 4/0407* (2013.01); *H01M 10/052* (2013.01); *H01M 10/0562* (2013.01); *Y02E 60/122* (2013.01); *Y02P 70/54* (2015.11); *Y02T 10/7011* (2013.01)

(58) Field of Classification Search
USPC ................ 156/247, 289, 307.1, 307.3, 308.2, 156/309.9
See application file for complete search history.

(56) References Cited

U.S. PATENT DOCUMENTS 6,656,309 B1* 12/2003 Parker ..................... B32B 27/00
156/249
2002/0018939 A1   2/2002 Kugai et al.
(Continued)

FOREIGN PATENT DOCUMENTS

CN     101076914 A     11/2007
CN     101911369 A     12/2010
(Continued)

OTHER PUBLICATIONS

U.S. Appl. No. 14/405,231 in the name of Kazuhito Kato filed Dec. 3, 2014.
(Continued)

*Primary Examiner* — Sing P Chan
(74) *Attorney, Agent, or Firm* — Oliff PLC

(57) ABSTRACT

Provided is a method for manufacturing a solid battery by which a high-power solid battery can be manufactured. The present invention is a method for manufacturing a solid battery having a pair of electrode layers, and a solid electrolyte layer disposed between the pair of electrode layers, the method including a preparing step to prepare a foil-electrolyte laminated body having a foil and a solid electrolyte layer which contains a binder and is disposed on at least one face of the foil, an electrode layer forming step to form an electrode layer by laminating an electrode material on a surface of the solid electrolyte layer of the foil-electrolyte laminated body prepared by the preparing step and pressing them, and a foil removing step to remove the foil after the electrode layer forming step.

4 Claims, 3 Drawing Sheets

(51) Int. Cl.
*B32B 37/12* (2006.01)
*B32B 37/26* (2006.01)
*B32B 38/10* (2006.01)
*H01M 10/0585* (2010.01)
*H01M 2/14* (2006.01)
*H01M 2/16* (2006.01)
*H01M 4/04* (2006.01)
*H01M 10/052* (2010.01)
*H01M 10/0562* (2010.01)

(56) References Cited

U.S. PATENT DOCUMENTS

| | | |
|---|---|---|
| 2007/0048617 A1 | 3/2007 | Inda |
| 2011/0123868 A1 | 5/2011 | Kawaoka et al. |
| 2011/0177397 A1 | 7/2011 | Ogasa |
| 2012/0094185 A1 | 4/2012 | Tsuchida et al. |
| 2012/0115018 A1 | 5/2012 | Kawaoka et al. |
| 2012/0225351 A1 | 9/2012 | Kojima |
| 2013/0260258 A1 | 10/2013 | Tsuchida et al. |
| 2014/0150961 A1 | 6/2014 | Hama et al. |

FOREIGN PATENT DOCUMENTS

| | | |
|---|---|---|
| CN | 101971407 A | 2/2011 |
| JP | A-2001-351615 | 12/2001 |
| JP | B2-3453099 | 10/2003 |
| JP | A-2004-206942 | 7/2004 |
| JP | A-2007-066703 | 3/2007 |
| JP | A-2008-091328 | 4/2008 |
| JP | 2008-135287 A | 6/2008 |
| JP | A-2009-301959 | 12/2009 |
| JP | A-2010-282948 | 12/2010 |
| JP | A-2011-150817 | 8/2011 |
| WO | 2011/064842 A1 | 6/2011 |
| WO | WO 2012/077225 A1 | 6/2012 |
| WO | WO 2013/014759 A1 | 1/2013 |

OTHER PUBLICATIONS

Oct. 23, 2012 Search Report issued in Japanese Patent Application No. PCT/2012/067696.

\* cited by examiner

METHOD FOR MANUFACTURING SOLID BATTERY

TECHNICAL FIELD

The present invention relates to a method for manufacturing a solid battery using a solid electrolyte.

BACKGROUND ART

A lithium-ion secondary battery (hereinafter sometimes referred to as "lithium secondary battery") has characteristics that it has a higher energy density and is operable at a high voltage compared to other secondary batteries. Therefore, it is used for information devices such as a cellular phone, as a secondary battery which can be easily reduced in size and weight, and nowadays there is also an increasing demand for the lithium-ion secondary battery to be used as a power source for large-scale apparatuses such as electric vehicles and hybrid vehicles.

A lithium-ion secondary battery comprises a cathode layer, an anode layer, and an electrolyte layer disposed between them. An electrolyte to be employed in the electrolyte layer is, for example, a non-aqueous liquid or a solid. When the liquid is used as the electrolyte (hereinafter, the liquid being referred to as "electrolytic solution"), it permeates into the cathode layer and the anode layer easily. Therefore, an interface can be formed easily between the electrolytic solution and active materials contained in the cathode layer and the anode layer respectively, and the battery performance can be easily improved. However, since commonly used electrolytic solutions are flammable, it is necessary to mount a system to ensure safety. On the other hand, if a nonflammable solid electrolyte (hereinafter referred to as "solid electrolyte") is used, the above system can be simplified. As such, lithium-ion secondary batteries having a layer containing a solid electrolyte have been suggested. (hereinafter, the layer being referred to as "solid electrolyte layer" and the battery being referred to as "solid battery").

As a technique related to such a solid battery, Patent Document 1 for example discloses a method for manufacturing a lithium-ion second battery, the method includes the steps of: preparing a cathode active material in powder form; preparing an anode active material in powder form; preparing an electrolyte material in powder form which includes lithium element; filling up the cathode active material, the anode active material, and the electrolyte material into a predetermined mold in a way that the electrolyte material exists being mixed with the cathode material in an upper portion or a lower portion of the predetermined mold, at the same time in a way that only the electrolyte material exists in a central portion of the predetermined mold; and pressing the cathode active material, the anode active material and the electrolyte material to form a solid cathode layer composed of a mixture of the cathode active material and the electrolyte material, a solid anode layer, and a solid electrolyte layer including lithium.

CITATION LIST

Patent Literatures

Patent Document 1: Japanese Patent No. 3453099

SUMMARY OF THE INVENTION

Problems to be Solved by the Invention

According to the technique disclosed in Patent Document 1, it is possible to manufacture a solid battery. However, since the solid electrolyte layer is formed by pressing the electrolyte material in powder form, cracking and the like easily occur in the solid electrolyte layer, and if the solid electrolyte layer is thinned in order to improve output power, short circuit is easy to occur. Therefore, with the technique disclosed in Patent Document 1, there were problems such that it is difficult to manufacture a high-power solid battery.

Accordingly, an object of the present invention is to provide a method for manufacturing a solid battery by which a high-power solid battery can be manufactured.

Means for Solving the Problems

In order to solve the above problems, the present invention takes the following means.

Namely, the present invention is a method for manufacturing a solid battery having a pair of electrode layers and a solid electrolyte layer disposed between the pair of electrode layers, the method comprising: a preparing step to prepare a foil-electrolyte laminated body having a foil and a solid electrolyte layer which contains a binder and is disposed on at least one face of the foil; an electrode layer forming step to form an electrode layer by laminating an electrode material on a surface of the solid electrolyte layer of the foil-electrolyte laminated body prepared by the preparing step and pressing them; and a foil removing step to remove the foil after the electrode layer forming step.

Herein, a "pair of electrode layers" refers to a cathode layer having a cathode active material and an anode layer having an anode active material.

In the present invention, it is preferable to have a frame body disposing step to dispose a frame body around the foil-electrode laminated body.

Effects of the Invention

For example, by a configuration of: forming the solid electrolyte layer having a binder on a surface of the foil; laminating an electrode material on a surface of the electrolyte layer and pressing them; and removing the foil, it is possible to make a solid electrolyte layer thinned without having a pinhole and the like which cause short circuit. Making the solid electrolyte layer thinned enables a solid battery to be high-powered. Therefore, according to the present invention it is possible to provide a method for manufacturing a solid battery by which a high-power solid battery can be manufactured.

Further, having the frame body disposing step enables to press the foil-electrolyte laminated body and the like which a frame body is disposed therearound. By pressing the foil-electrolyte laminated body and the like with a configuration that the frame body is disposed therearound, it is possible to make an outer periphery of the solid electrolyte layer adhere tightly to the frame body, which enables to prevent a situation of electrical conduction of the pair of electrode layers at the outer periphery of the solid electrolyte layer (short circuit). Therefore, by the configuration mentioned above, the solid battery manufactured by the manufacturing method of the present invention is easy to be high-powered.

MODE FOR CARRYING OUT THE INVENTION

Hereinafter, the method for manufacturing a solid battery of the present invention (hereinafter, sometimes referred to as "the manufacturing method of the present invention") will be described with reference to the drawings. It should be noted, however, that the embodiments shown below are examples of the present invention and the present invention is not limited to these embodiments.

Figure 1:
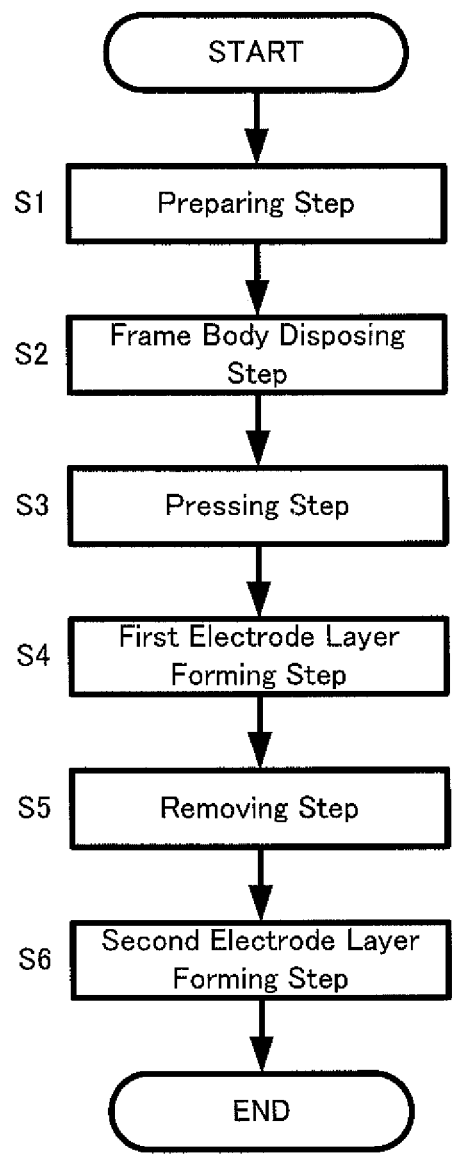
FIG. 1 is a flowchart showing a method for manufacturing a solid battery.
Figure 2:
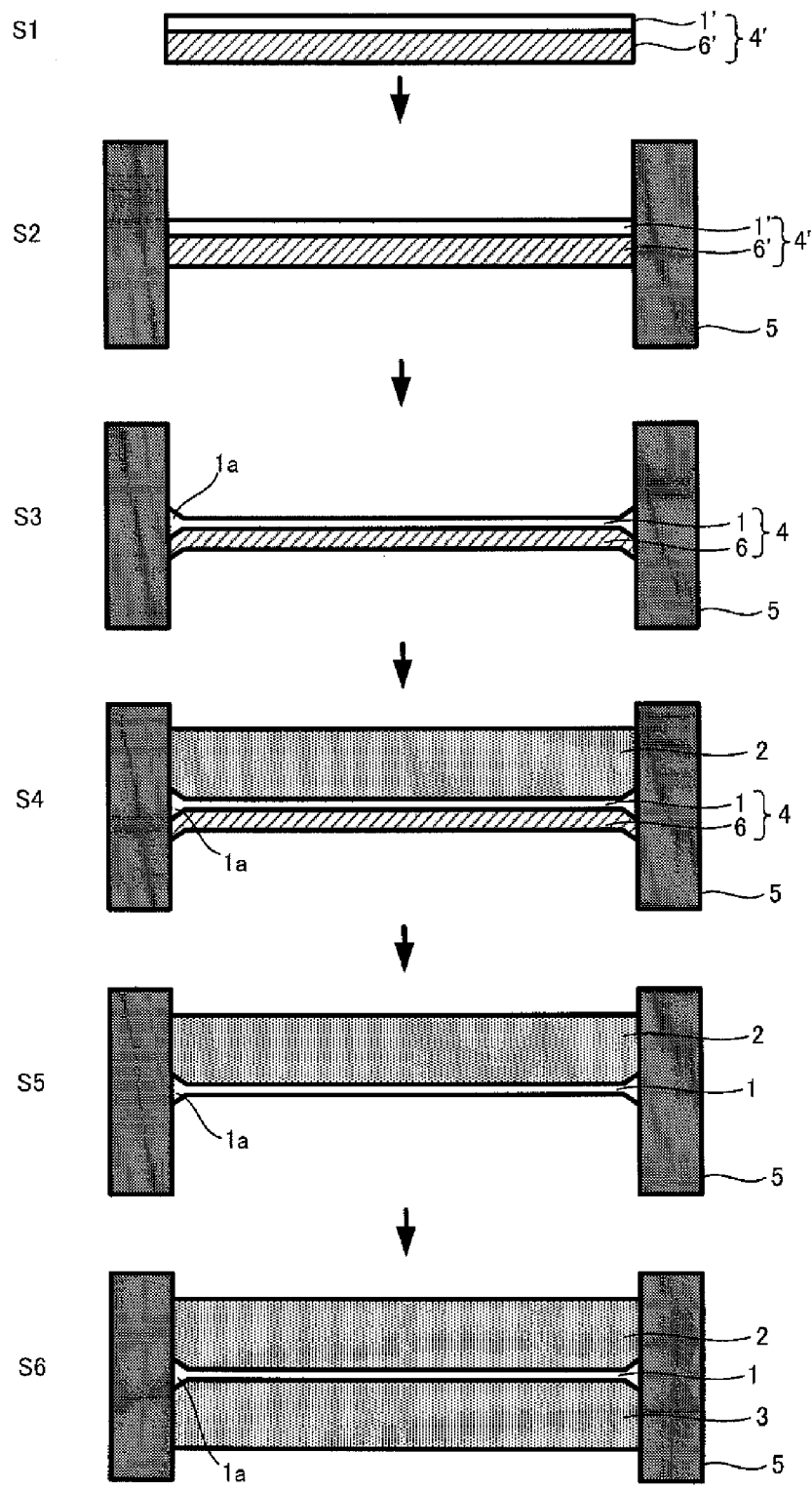
FIG. 2 is a view illustrating each step being simplified.

FIG. 1 is a flowchart showing the manufacturing method of the present invention, and FIG. 2 is a view illustrating each step shown in FIG. 1 being simplified. Hereinafter, the manufacturing method of the present invention will be described with references to FIG. 1 and FIG. 2. The manufacturing method shown in FIG. 1 has a preparing step (S1), a frame body disposing step (S2), a pressing step (S3), a first electrode layer forming step (S4), a removing step (S5), and a second electrode layer forming step (S6).

The preparing step (hereinafter sometimes referred to as "S1") is a step to prepare a foil-electrolyte laminated body having a foil and a solid electrolyte layer which contains a binder and is disposed on at least one face of the foil. The configuration of S1 is not particularly limited as long as the foil-electrolyte lamination body can be prepared. For example, as shown in FIG. 2, S1 may be a step of: applying a solid electrolyte composition in slurry form made by adding a solid electrolyte and a binder in a liquid to a surface of a foil 6'; volatilizing the liquid; and thereby making a foil-electrolyte laminated body 4' having the foil 6' and a solid electrolyte layer 1' having the solid electrolyte and the binder formed on the surface of the foil 6'.

The frame body disposing step (hereinafter sometimes referred to as "S2") is a step to dispose a frame body having an opening portion which has the same size of the foil-electrolyte laminated body 4' or is larger than the foil-electrolyte laminated body 4' around the foil-electrolyte laminated body 4' prepared in S1. If the opening portion of the frame body 5 is larger than the foil-electrolyte laminated body 4', the difference of the sizes between the opening portion of the frame body 5 and the foil-electrolyte laminated body 4' is made so that a convex portion 1a described below is able to be formed. The configuration of S2 is not particularly limited as long as it is a step to dispose the frame body around the foil-electrolyte laminated body.

The pressing step (hereinafter sometimes referred to as "S3") is a step to press the foil-electrolyte laminated body 4' which the frame body 5 is disposed therearound in S2 from the top and bottom direction of the plane of paper of FIG. 2 in a manner to compress the solid electrolyte layer 1'. When the foil-electrolyte laminated layer 4' is pressed in S3 from the top and bottom direction of the plane of paper of FIG. 2, the foil-electrolyte laminated layer 4' enlarges in a direction intersecting with the top and bottom direction of the plane of paper of FIG. 2. As a result, as shown in FIG. 2, the convex portion 1a having contact with an inner periphery of the frame body 5 is formed on an outer periphery of the foil-electrolyte laminated body 4, and the foil-electrolyte laminated body 4 having the solid electrolyte layer 1 and the foil 6 adheres tightly to the frame body 5. The pressure to be applied to the foil-electrolyte laminated body 4' in the pressing of S3 is not particularly limited. In view of making a configuration easy to prevent short circuit of the pair of electrode layers, it is preferable to form the convex portion 1a having a height of a few nm or more in the top and bottom direction of the plane of paper of FIG. 2 (for example, 10 nm or more). By adding pressure of 1 MPa or more to 500 MPa or less for example, it is possible to form the convex portion 1a having a height of a few nm or more.

The first electrode layer forming step (hereinafter sometimes referred to as "S4") is, after S3, a step of: laminating an electrode material on a surface of the solid electrolyte layer 1 (a face where the foil 6 does not exist, the upper face of the solid electrolyte layer 1 in FIG. 2); pressing the electrode material and the solid electrolyte layer 1 from the top and bottom direction of the plane of paper in FIG. 2 in a manner to compress the electrode material and the electrolyte layer 1, thereby forming an electrode layer 2 (a cathode layer or an anode layer) on one face of the solid electrolyte layer 1. The pressure to be applied to the electrode material and the foil-electrolyte laminated body 4 in the pressing in S4 is not particularly limited as long as an electrode layer of a solid battery can be formed by the pressure, and the pressure may be 1 MPa or more to 500 MPa or less for example. The electrode material to be laminated on the surface of the solid electrolyte layer 1 in S4 may contain an active material (a cathode active material or an anode active material) and a solid electrolyte for example, and other than the active material and the solid electrolyte, the electrode material may contain a binder to bond the active material and the solid electrolyte and an electrical conducting material to improve electrical conductivity.

The removing step (hereinafter sometimes referred to as "S5") is a step to remove the foil 6 disposed to the one face of the solid electrolyte layer 1 (the lower face of the solid electrolyte layer in FIG. 2) after S4. The configuration of S5 is not particularly limited as long as the foil 6 can be removed from the one face of the solid electrolyte layer 1. For example, S5 may be a step of peeling off the foil 6 from the solid electrolyte layer 1. Other than this, S5 may be a step of removing the foil 6 by immersing the entire frame body 5 in a liquid to dissolve the foil 6.

The second electrode forming step (hereinafter sometimes referred to as "S6") is, after S5, a step of: laminating an electrode material on a face of the solid electrolyte layer 1 where the foil 6 used to be disposed (hereinafter referred to as "the other face of the solid electrolyte layer 1"); pressing the electrode material, the solid electrolyte layer 1, and the electrode layer 2 from the top and bottom direction of the plane of paper of FIG. 2 in a manner to compress them, and thereby forming a electrode layer 3 (if the electrode layer 2 is a cathode layer, the electrode layer 3 is an anode layer, and if the electrode layer 2 is an anode layer, the electrode layer 3 is a cathode layer) on the other face of the solid electrolyte layer 1. The pressure to be applied to the electrode material, the solid electrolyte layer 1, and the electrode layer 2 in the pressing in SE is not particularly limited as long as an electrode layer of a solid battery can be formed by the pressure, and the pressure may be 1 MPa or more to 500 MPa or less for example. The electrode material to be laminated on the other face of the solid electrolyte layer 1 in S6 may contain an active material (an anode active material or a cathode active material) and a solid electrolyte for example, and other than the active material and the solid electrolyte, the electrode material may contain a binder to bond the active material and the solid electrolyte and an electrical conducting material to improve electrical conductivity.

According to the method for manufacturing a solid battery of the present invention, by going through S1 to S6 for example, a solid battery having the solid electrolyte layer 1, the electrode layer 2 formed on one face of the solid electrolyte layer 1, and the electrode layer 3 formed on the other face of the solid electrolyte layer 1 can be manufactured. Particularly, the configuration having S1 to prepare the foil-electrolyte laminated body enables to make the solid electrolyte layer 1 thinned without having a pinhole and the like which cause short circuit, and thus enables the solid battery having the solid electrolyte layer 1 to be high-powered. Meanwhile, a current collector may be connected to each of the electrode layer 2 and the electrode layer 3, and the solid battery may be sealed up by an exterior material such as a laminate film.

Further, the configuration having S2 to dispose the frame body 5 around the foil-electrolyte laminated body 4 enables to form the convex portion 1a on the outer periphery of the foil-electrolyte laminated body 4 in S3 after S2 and the outer periphery of the solid electrolyte layer 1 can adhere tightly to the frame body 5. By adhering the outer periphery of the solid electrolyte layer 1 tightly to the frame body 5, it is possible to prevent a situation that an electrical conducting substance constituting the electrode layer 2 or an electrical conducting substance constituting the electrode layer 3 comes around the outer periphery of the solid electrolyte layer 1 and causes electrical conduction (short circuit). Also, forming the convex portion 1a enables to make only the outer periphery of the solid electrolyte layer 1 thick, thereby it is possible to make a configuration which is difficult to form a hole made through the outer periphery of the solid electrolyte layer 1. The configuration which is difficult to form a hole in the outer periphery of the solid electrolyte layer 1 makes it easy to prevent short circuit. Therefore, by the configuration having S2, the solid battery manufactured by the manufacturing method of the present invention is easily made to be high-powered.

In the present invention, as the solid electrolyte to be contained in the solid electrolyte layer, a known solid electrolyte which can be used in a solid battery may be adequately employed. Examples of such a solid electrolyte may include: sulfide solid electrolytes such as $Li_2S$—$P_2S_5$ prepared by mixing $Li_2S$ and $P_2S_5$, and $Li_3PS_4$; oxide solid electrolytes such as $Li_3PO_4$; nitride solid electrolytes; halide solid electrolytes and the like. Also the configuration of the solid electrolyte is not particularly limited, and the solid electrolyte may be a crystalline solid electrolyte, an amorphous solid electrolyte, or a glass ceramics. Further, in the present invention, in view of making the configuration easy to prevent a pinhole and the like while at the same time easy to peel off the foil without breaking the solid electrolyte layer, it is preferable to contain a binder which bonds the solid electrolytes to each other in the solid electrolyte layer. Examples of such a binder may include styrene-butadiene rubber and the like. However, in view of enabling to form the solid electrolyte layer having solid electrolytes dispersed uniformly and at the same time being prevented from excess aggregation and so on, the binder to be contained in the solid electrolyte layer is preferably 1% by mass or less. As the liquid to be used when the solid electrolyte layer is made, a known liquid which can be used upon preparing a composition in slurry form used when a solid electrolyte layer of a lithium-ion secondary battery is made may be adequately used. Examples of such a liquid may include heptane and the like, and a non-polar solvent may be preferably used.

In the present invention, the configuration of the foil 6 which constitutes the foil-electrolyte laminated body 4 is not particularly limited as long as it is capable of forming the solid electrolyte layer 1 being thinned without having a pinhole and the like which cause short circuit. As the foil 6, for example, an aluminum foil, release films made of polyester or polyethylene terephthalate (PET) and the like may be used. The thickness of the foil 6 may be 1 μm or more to 150 μm or less for example.

Also, in the present invention, the configuration of the frame body 5 is not particularly limited as long as the convex portion 1a can be formed. The material of the frame body 5 is not particularly limited, but in view of hardness, elastic modulus and the like, a ceramic such as Macor or the like ("Macor" is a registered trademark of U.S. Corning Incorporated. Same in what follows) is preferably used.

In the present invention, as the cathode active material to be contained in the cathode layer, a known active material which can be contained in a cathode layer of a lithium-ion secondary battery may be adequately used. Examples of such a cathode active material may include: a layered active material such as lithium cobalt oxide ($LiCoO_2$) and lithium nickel oxide ($LiNiO_2$); an olivine type active material such as olivine type lithium iron phosphate ($LiFePO_4$); a spinel type active material such as spinel type oxide manganese lithium ($LiMn_2O_4$) and the like. Also, as the solid electrolyte to be contained in the cathode layer, a known solid electrolyte which can be contained in a cathode layer of a lithium-ion secondly battery may be adequately used. Examples of such a solid electrolyte may include the above mentioned electrolytes and the like which can be contained in the solid electrolyte layer. Other than this, the cathode layer may contain a binder to bond the active material and the solid electrolyte and an electrical conducting material to improve electrical conductivity. As the binder which can be contained in the cathode layer, styrene-butadiene rubber (SER) and the like may be exemplified. As the electrical conducting material which can be contained in the cathode layer, a vapor-grown carbon fiber (VGCF. "VGCF" is a registered trademark of Showa Denko K.K. Same in what follows), carbon materials such as carbon black, and metallic materials which can endure environment upon using a solid battery may be exemplified.

Also, in the present invention, as the anode active material to be contained in the anode layer, a known active material which can be contained in an anode layer of a lithium-ion secondary battery may be adequately used. Examples of such an active material may include graphite and the like. As the solid electrolyte to be contained in the anode layer, a known solid electrolyte which can be contained in an anode layer of a lithium-ion secondary battery may be adequately used. Examples of such a solid electrolyte may include the above mentioned solid electrolytes and the like which can be contained in the cathode layer. Other than this, the anode layer may contain a binder to bond the active material and the solid electrolyte, and an electrical conducting material to improve electrical conductivity. As the binder and the electrical conductive material, the above mentioned binders and electrical conductive materials and the like which can be contained in a cathode layer may be exemplified.

In the present invention, if a current collector is connected to each of the electrode layer 2 and the electrode layer 3, the current collector may be composed of a known conductive material which can be used as a cathode current collector and an anode current collector of a lithium-ion secondary battery. As such a conductive material, a metallic material including at least one or more elements selected from the group consisting of Cu, Ni, Al, V, Au, Pt, Mg, Fe, Ti, Co, Cr, Zn, Ge, and In may be exemplified. Also, the current collector may be in a form of a metallic foil, metallic mesh or the like for example.

In the above descriptions of the present invention, the configuration having the frame body disposing step after the preparing step has been shown. However, the manufacturing method of the present invention is not limited to this configuration. The manufacturing method of the present invention may be configured without the frame body disposing step. However, in view of manufacturing a high-power solid battery easily with a configuration easy to prevent short circuit at the outer periphery of the solid electrolyte, the configuration preferably has the frame body disposing step after the preparing step.

Also, in the above descriptions of the present invention, the configuration having the pressing step before the electrode layer forming steps (the first electrode layer forming step and the second electrode layer forming step) has also been shown. However, the manufacturing method of the present invention is not limited to this configuration. The present invention may be configured such that the solid electrolyte layer is not pressed in advance before the electrode layers are formed.

Further, in the above descriptions of the present invention, the configuration has also been shown in which the solid battery is a lithium-ion secondly battery. However, the manufacturing method of the present invention is not limited to this configuration. In the solid battery to be manufactured in the present invention, ions other than lithium ions may move between the cathode layer and the anode layer. Examples of such ions may include a sodium ion, a potassium ion and so on. When the configuration in which ions other than lithium ions move is adopted, the cathode active material, the solid electrolyte, and the anode active material may be adequately selected depending on the ions to move.

EXAMPLES

The following batteries were made to evaluate the performance thereof: a battery manufactured by the manufacturing method of the present invention (Example); and batteries manufactured by methods other than the manufacturing method of the present invention (Comparative Examples).

<Preparing a Solid Electrolyte>

$Li_2S$ (manufactured by Nippon Chemical Industrial) and $P_2S_5$ (manufactured by Aldrich) were used as starting ingredients, and 0.7656 g of $Li_2S$ and 1.2344 g of $P_2S_5$ were weighed. Next, the weighed ingredients were mixed in an agate mortar for 5 minutes. After that, 4 g of heptane was added to the mixture and mechanical milling was carried out using a planetary ball mill for 40 hours, thereby $Li_2S$—$P_2S_5$ as a sulfide solid electrolyte was prepared.

<Production of an Electrode Material and an Solid Electrolyte Composition>

A Cathode Composite (an Electrode Material)

A cathode composite was obtained by mixing weighed 12.03 mg of a cathode active material ($LiNi_{1/3}CO_{1/3}Mn_{1/3}O_2$, manufactured by Nichia Corporation), 0.51 mg of VGCF (manufactured by Showa Denko K.K.), and 5.03 mg of the solid electrolyte ($Li_2S$—$P_2S_5$) prepared by the above step.

An Anode Composite (an Electrode Material)

An anode composite was obtained by mixing weighed 9.06 mg of an anode active material (graphite, manufactured by Mitsubishi Chemical Corporation) and 8.24 mg of the solid electrolyte ($Li_2S$—$P_2S_5$) prepared by the above step.

A Solid Electrolyte Composition

A solid electrolyte composition in slurry form was prepared by adding 3.5 mg of styrene-butadiene rubber to 500 mg of the solid electrolyte ($Li_2S$—$P_2S_5$) prepared by the above step and further adding 1000 mg of heptane.

<Production of a Foil-Electrolyte Laminated Body>

An aluminum foil having a thickness of 15 μm was coated with the solid electrolyte composition in slurry form prepared by the above step with a gap of 200 μm (having a distance of 200 μm between the aluminum foil and a doctor blade) to form a solid electrolyte layer having a thickness of 80 μm, thereby a foil-electrolyte laminated body was prepared. The length and width of the solid electrolyte layer were a few cm respectively.

<Production of a Battery (Example)>

Example

The outer periphery of the foil-electrode laminated body was cut out into a size of 1 cm² by a frame body made of a ceramic (Macor), then the foil-electrolyte laminated body was pressed at a pressure of 100 MPa. The thickness of the solid electrolyte layer after the pressing was 40 μm. Thereafter, 17.57 mg of the cathode composite described above was disposed on an upper face of the solid electrolyte layer and pressed at a pressure of 100 MPa, thereby a cathode layer was formed having a size of 1 cm². Then, the aluminum foil was removed from the solid electrolyte layer. On the face of the solid electrolyte layer which used to have contact with the aluminum foil, 17.3 mg of the anode composite described above was disposed and pressed at a pressure of 400 MPa, thereby an anode layer was formed. Accordingly, a solid battery of the Example was made.

<Production of Batteries (Comparative Examples)>

Comparative Example 1

A solid electrolyte layer having a thickness of 40 μm and a size of 1 cm² was made by weighing 18 mg of the solid electrolyte ($Li_2S$—$P_2S_5$) prepared by the above step and pressing the solid electrolyte at a pressure of 100 MPa without disposing a frame body around the solid electrolyte. Thereafter, 17.57 mg of the cathode composite described above was disposed on an upper face of the solid electrolyte layer and pressed at a pressure of 100 MPa, thereby a cathode layer having a size of 1 cm² was formed. The side of the solid electrolyte layer where the cathode layer was not formed was faced up, then 17.3 mg of the anode composite mentioned above was disposed thereon and pressed at a pressure of 400 MPa, thereby an anode layer having a size of 1 cm² was formed. Accordingly, a solid battery of the Comparative Example 1 was made.

Comparative Example 2

A solid electrolyte layer having a thickness of 40 μm and a size of 1.2 cm² was made by weighing 21.6 mg of the solid electrolyte ($Li_2S$—$P_2S_5$) prepared by the above step and pressing the solid electrolyte at a pressure of 100 MPa without disposing a frame body around the solid electrolyte. Thereafter, 17.57 mg of the above cathode composite was disposed on an upper face of the solid electrolyte layer and pressed at a pressure of 100 MPa, thereby a cathode layer having a size of 1 cm² was formed. The face of the solid electrolyte layer where the cathode layer was not formed was faced up, then 17.3 mg of the anode composite mentioned above was disposed thereon and pressed at a pressure of 400 MPa, thereby an anode layer was formed. Accordingly, a solid battery of the Comparative Example 2 was made.

Comparative Example 3

On a center portion of a frame body (a portion where a frame does not exist) made of a ceramic (Macor), 18 mg of weighed solid electrolyte ($Li_2S$—$P_2S_5$) prepared in the above step was disposed and pressed at a pressure of 100 MPa, thereby a solid electrolyte layer having a thickness of 40 μm and a size of 1 cm² was made. Thereafter, 17.57 mg of the cathode composite described above was disposed on an upper face of the solid electrolyte layer and pressed at a pressure of 100 MPa, thereby a cathode layer having a size of 1 cm² was formed. The face where the cathode layer was not formed was faced up, then 17.3 mg of the anode composite mentioned above was disposed thereon and pressed at a pressure of 400 MPa, thereby an anode layer having a size of 1 cm² was formed. Accordingly, a solid battery of the Comparative Example 3 was made.

<Performance Evaluation of the Batteries>

Figure 3:
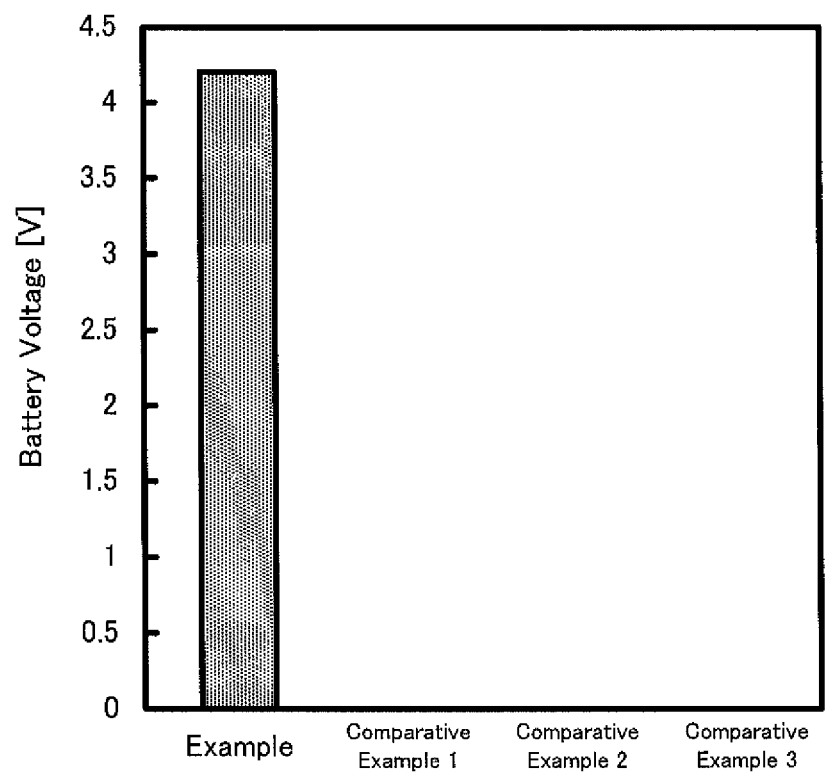
FIG. 3 is a graph showing results of performance evaluation of batteries.

Each of the batteries of the Example, the Comparative Example 1, the Comparative Example 2, and the Comparative Example 3 made by the above steps was charged with constant current of 0.3 mA until 4.2V, and thereafter discharged with 0.3 mA until 2.5 V. After that, each battery was kept at 4.2V for 24 hours and the condition of decrease in voltage was examined. The results are shown in FIG. 3. The vertical axis of FIG. 3 shows battery voltage [V].

As shown in FIG. 3, the voltage of the battery of the Example was 4.2 V. That is, there was no short circuit in the battery of the Example. In contrast, each voltage of the batteries of the Comparative Example 1, the Comparative Example 2, and the Comparative Example 3 was 0 V, which means there was short circuit. The reason of short circuit occurred in the battery of the Comparative Example 1 is that particles which had composed the cathode layer and the anode layer fell at the outer periphery of the solid electrolyte, and the cathode layer and the anode layer were connected via the particles fallen. As seen above, a solid electrolyte layer made by pressing a solid electrolyte alone is difficult to handle and easy to be cracked. The reason of short circuit occurred in the battery of the Comparative Example 2 is that, when it was pressed, the pressure was hardly applied to the outer periphery of the solid electrolyte layer where the electrode layer was not formed, and the outer periphery of the solid electrolyte layer was cracked. Then, the particles which had fallen from the cathode layer and anode layer entered in the cracked area thereby the cathode layer and the anode layer were connected. As seen above, if a gap was provided at the outer periphery of the solid electrolyte, cracking and falling occur at the outer periphery thereby short circuit is caused. The reason of short circuit occurred in the battery of the Comparative Example 3 is considered that the solid electrolyte layer was cracked since a binder was not contained in the solid electrolyte layer. As described above, according to the present invention, it was possible to manufacture a high-power solid battery.

The present invention has been described above as to the embodiments which are supposed to be practical as well as preferable at present. However, it should be understood that the present invention is not limited to the embodiments disclosed in the specification of the present application and can be appropriately modified within the range that does not depart from the gist or spirit of the invention, which can be read from the appended claims and the overall specification, and that a method for manufacturing a solid battery with such modifications is also encompassed within the technical range of the present invention.

DESCRIPTION OF THE REFERENCE NUMERALS 1, 1' solid electrolyte layer
2, 3 electrode layer
4, 4' foil-electrolyte laminated body
5 frame body
6, 6' foil

The invention claimed is:

1. A method for manufacturing a solid battery having a pair of electrode layers and a solid electrolyte layer disposed between the pair of electrode layers, the method comprising:
   a preparing step to prepare a foil-electrolyte laminated body having a foil and a solid electrolyte layer which contains a binder and is disposed on at least one face of the foil;
   a frame body disposing step to dispose a frame body around the foil-electrolyte laminated body;
   a pressing step to press the foil-electrolyte laminated body with the frame disposed therearound that forms a convex portion on an outer periphery of the foil-electrolyte laminated body and that adheres the foil-electrolyte body to the frame body without clearance therebetween;
   an electrode layer forming step to form an electrode layer by laminating an electrode material on a surface of the solid electrolyte layer of the foil-electrolyte laminated body prepared by the preparing step and pressing them; and
   a foil removing step to remove the foil after the electrode layer forming step.

2. The method for manufacturing a solid battery according to claim 1, further comprising a second electrode forming step following the foil removing step to form a second electrode layer by laminating a second electrode material on a face of the solid electrolyte layer where the foil used to be disposed and pressing them.

3. The method for manufacturing a solid battery according to claim 1, wherein the frame body disposing step is before the electrode layer forming step.

4. A method for manufacturing a solid battery having a pair of electrode layers and a solid electrolyte layer disposed between the pair of electrode layers, the method comprising:
   a preparing step to prepare a foil-electrolyte laminated body having a foil and a solid electrolyte layer which contains a binder and is disposed on at least one face of the foil;
   a frame body disposing step to dispose a frame body around the foil-electrolyte laminated body;
   a pressing step to press the foil-electrolyte laminated body with the frame disposed therearound that forms a convex portion on an outer periphery of the foil-electrolyte laminated body and that adheres the foil-electrolyte body to the frame body without clearance therebetween;
   an electrode layer forming step to form an electrode layer by laminating an electrode material on a surface of the solid electrolyte layer of the foil-electrolyte laminated body after the pressing step;
   a foil removing step to remove the foil after the electrode layer forming step; and
   a second electrode forming step following the foil removing step to form a second electrode layer by laminating a second electrode material on a face of the solid electrolyte layer where the foil used to be disposed and pressing them.

* * * * *